(12) United States Patent
Carlton et al.

(10) Patent No.: US 9,173,054 B2
(45) Date of Patent: *Oct. 27, 2015

(54) DATA TRANSFER BETWEEN WIRELESS DEVICES

(71) Applicant: InterDigital Patent Holdings, Inc., Wilmington, DE (US)

(72) Inventors: Alan G. Carlton, Mineola, NY (US); Alexander Reznik, Titusville, NJ (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/251,383

(22) Filed: Apr. 11, 2014

(65) Prior Publication Data

US 2014/0220900 A1    Aug. 7, 2014

Related U.S. Application Data

(63) Continuation of application No. 13/930,743, filed on Jun. 28, 2013, now Pat. No. 8,737,933, which is a continuation of application No. 13/493,650, filed on Jun. 11, 2012, now Pat. No. 8,478,207, which is a continuation of application No. 12/644,948, filed on Dec. 22, 2009, now Pat. No. 8,200,265.

(60) Provisional application No. 61/140,126, filed on Dec. 23, 2008.

(51) Int. Cl.
| | |
|---|---|
| *H04W 4/00* | (2009.01) |
| *H04W 4/02* | (2009.01) |
| *H04L 29/08* | (2006.01) |
| *G06F 3/0482* | (2013.01) |
| *G06F 3/0488* | (2013.01) |

(52) U.S. Cl.
CPC ............. *H04W 4/008* (2013.01); *G06F 3/0482* (2013.01); *G06F 3/0488* (2013.01); *H04L 67/16* (2013.01); *H04L 67/18* (2013.01); *H04W 4/02* (2013.01)

(58) Field of Classification Search
CPC combination set(s) only.
See application file for complete search history.

(56) References Cited

U.S. PATENT DOCUMENTS

| | | | |
|---|---|---|---|
| 5,544,321 A | 8/1996 | Theimer et al. | |
| 7,813,697 B2 | 10/2010 | McKillop | |
| 7,877,494 B2 | 1/2011 | Carlton et al. | |
| 8,200,265 B2 * | 6/2012 | Carlton et al. | ............... 455/509 |
| 8,478,207 B2 * | 7/2013 | Carlton et al. | ................... 455/73 |
| 8,611,317 B2 | 12/2013 | Banerjea et al. | |
| 8,737,933 B2 * | 5/2014 | Carlton et al. | ................... 455/73 |

(Continued)

FOREIGN PATENT DOCUMENTS

| | | |
|---|---|---|
| EP | 1 513 262 | 3/2005 |
| WO | 03/081373 | 10/2003 |

OTHER PUBLICATIONS

Hazas et al., "A Relative Positioning System for Co-located Mobile Devices," International Conference on Mobile Systems, Proceedings of the 3$^{rd}$ International Conference on Mobile Systems, Applications and Services, Seattle, Washington, 2005, pp. 177-190.

*Primary Examiner* — Diane Mizrahi

(74) *Attorney, Agent, or Firm* — Volpe and Koenig, P.C.

(57) ABSTRACT

A wireless transmit/receive unit (WTRU) may detect another WTRU over bluetooth. The WTRU may send to the another WTRU a message to transfer selected media. The WTRU may transfer the selected media to the another WTRU over WiFi.

50 Claims, 9 Drawing Sheets

(56) References Cited

U.S. PATENT DOCUMENTS

| | | |
|---|---|---|
| 2006/0234762 A1 | 10/2006 | Ozluturk |
| 2006/0293063 A1 | 12/2006 | Corrion |
| 2007/0146347 A1 | 6/2007 | Rosenberg |
| 2007/0177729 A1 | 8/2007 | Reznik et al. |
| 2007/0271379 A1 | 11/2007 | Carlton et al. |
| 2011/0119702 A1 | 5/2011 | Jang et al. |
| 2011/0119710 A1 | 5/2011 | Jang et al. |
| 2011/0126237 A1 | 5/2011 | Lee et al. |
| 2011/0138334 A1 | 6/2011 | Jung |

* cited by examiner

DATA TRANSFER BETWEEN WIRELESS DEVICES

CROSS REFERENCE TO RELATED APPLICATIONS

This application is a continuation of U.S. patent application Ser. No. 13/930,743, filed Jun. 28, 2013, which is a continuation of U.S. patent application Ser. No. 13/493,650, filed Jun. 11, 2012, which issued as U.S. Pat. No. 8,478,207 on Jul. 2, 2013, which is a continuation of U.S. patent application Ser. No. 12/644,948, filed Dec. 22, 2009, which issued as U.S. Pat. No. 8,200,265 on Jun. 12, 2012, which claims the benefit of U.S. Provisional Application Ser. No. 61/140,126, filed Dec. 23, 2008. The contents of the above-referenced applications are hereby incorporated by reference herein.

FIELD OF INVENTION

This application is related to wireless communications.

BACKGROUND

In current communications, functionality that allows the transfer of data (such as files or digital media) between devices in both fixed and wireless environments is commonplace. Currently, data transfers may be performed using applications such as electronic mail, or multimedia message services (MMS) with the data being transmitted from one device to another through suitable technologies, for example, General Packet Radio Service (GPRS) or Wireless Local Area Network (WLAN). As the sophistication of user interfaces supporting data transfers has developed (for example, the emergence of touch screen and multi-touch technology), the user experience has been simplified considerably. These advances in user interface technology may be seen in devices such as the Apple® iPhone® and iPod Touch®.

Despite these advances, however, file transfers may still be a cumbersome, multi-step task requiring adaptation between multiple implementations. For example, many technologies involve a fragmented approach to access and manipulation of files such as attachments. These hurdles inhibit the more regular use of file transfer schemes in spontaneous situations. A simplified and more intuitive approach to data transfer between devices is therefore required.

SUMMARY

A method for controlling communication of data in wireless communications, implemented in a wireless transmit/receive unit (WTRU) detects environment information relating to at least one candidate WTRU operating in a local area associated with the WTRU. A user input is received via a user interface, wherein the user input relates to a selection of data for transfer between the WTRU and at least one of the candidate WTRUs an to an identified target WTRU. The user input is processed as well as the information relating to the at least one candidate WTRU. At least one target WTRU is identified from the at least one candidate WTRU based in part on the user input. Information relating to candidate WTRUs is solicited through a lower layer. Environment information is used to identify the target WTRU and transmission instructions are generated to enable transmission of data to the target WTRU.

BRIEF DESCRIPTION OF THE DRAWING(S)

A more detailed understanding may be had from the following description, given by way of example in conjunction with the accompanying drawings wherein.

DETAILED DESCRIPTION OF THE PREFERRED EMBODIMENT(S)

When referred to hereafter, the terminology "wireless transmit/receive unit (WTRU)" includes but is not limited to a user equipment (UE), a communications device, a mobile station, a fixed or mobile subscriber unit, a pager, a cellular telephone, a personal digital assistant (PDA), a computer, or any other type of device capable of operating in a wireless environment. When referred to hereafter, the terminology "base station" includes but is not limited to a Node-B, a site controller, an access point (AP), or any other type of interfacing device capable of operating in a wireless environment.

Figure 1:
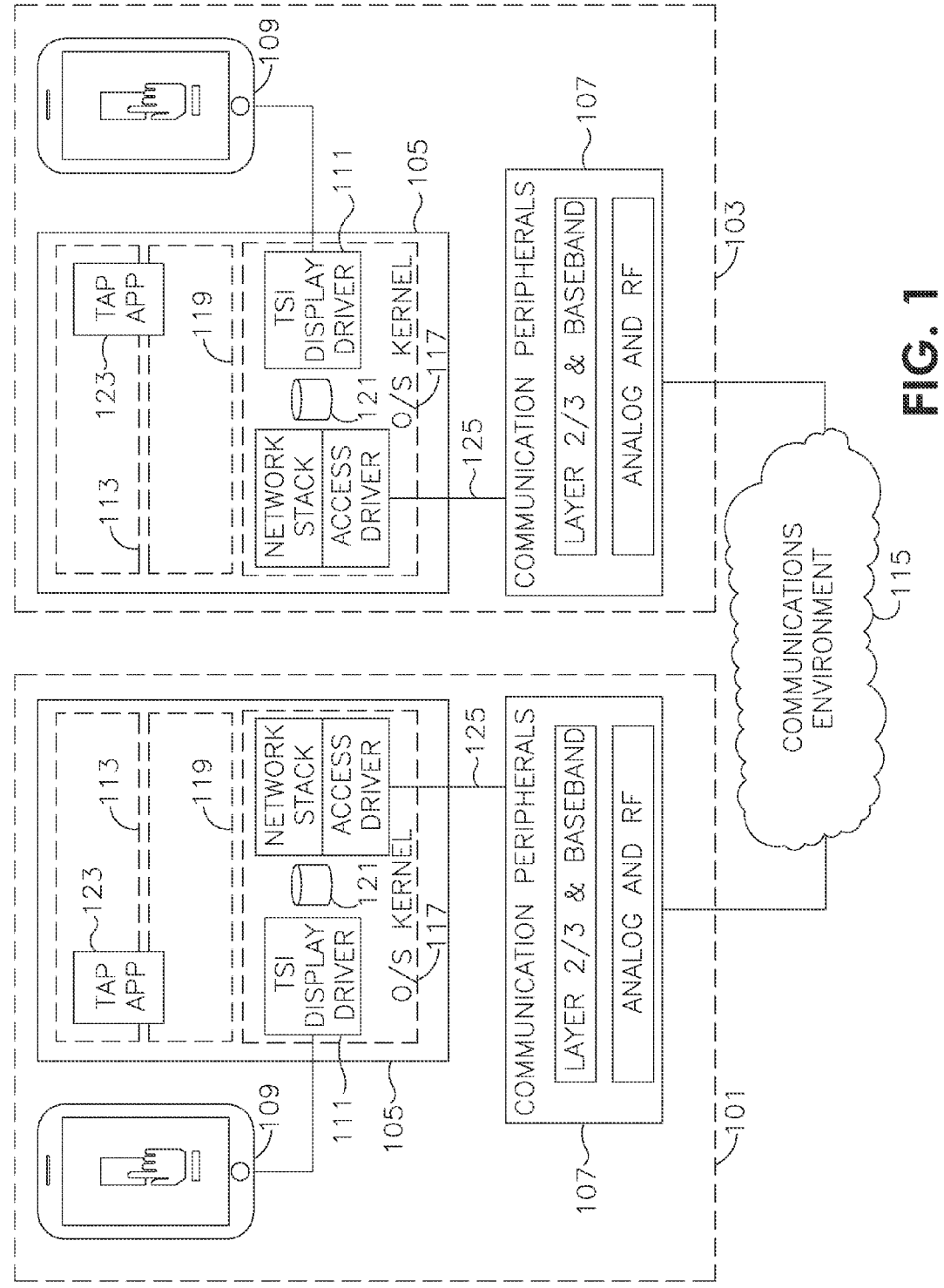
FIG. 1 shows a sending and receiving wireless transmit/receive unit (WTRU) that may be used for data transfer between devices.

FIG. 1 is an illustration of a sending WTRU 101 and a receiving WTRU 103 whereby data is transferred between the WTRUs. The sending WTRU 101 and the receiving WTRU 103 are similarly equipped. The sending WTRU 101 and receiving WTRU 103 are separated by a communications environment 115 that may include other similarly equipped WTRUs which are not shown for simplicity. In general, WTRU 101, and WTRU 103 are each minimally comprised of an application processor 105, a communication peripheral 107, and a touchscreen/display peripheral 109. The communication peripheral 107 may be implemented as a wireless personal area network (WPAN) device, for example Bluetooth®, Wireless Universal Serial Bus (W-USB) or WiFi® in ad-hoc mode. The application processor 105 may be equipped with software such as an operating system (O/S)/kernel 117 (for example, Linux® or Windows®), middleware 119, and applications 113. The O/S may include necessary drivers to provide support for the touchscreen 109 and the communication peripheral 107 in addition to a file system 121 for storing media. An application 123 (hereinafter referred to as "TapAPP") may include application software configured to implement a method of data transfer between WTRU 101 and WTRU 103. TapAPP 123 may run on the application processor 105 running a high-end O/S such as Linux® or Windows®, for example. The communication peripherals 107 may include technologies such as a third generation partnership (3GPP) second or third generation standards (2G/3G) modem, Bluetooth® or WiFi®. Any combination or all of these communication technologies may be implemented in a single component design. Other peripherals such as a touchscreen/display 109, may also be supported. Peripherals 107, 109 may be operationally coupled to the application processor 105 through a physical interface 125 which, by way of example, may be a serial peripheral interface (SPI) or shared memory. The application processor 105 may provide support for the peripherals 107, 109 through drivers or general application software.

TapAPP 123 may run on either or both of the sending 101 and receiving 103 WTRUs. TapAPP 123 may run on any communications device, and may be run in a send or receive mode. TapAPP 123 runs on the embedded O/S 117 and may be implemented as a native application, a Java® application or any other suitable type of application on the WTRUs 101, 103. TapAPP 123 may be a stand alone application 113 or may be tightly bound to middleware 119 thereby providing a background process, giving the user an "always on" usage experience. Additionally or alternatively, TapAPP 123 may be implemented as a plug-in application that may be launched by a user as needed in a manner known in the art. TapAPP 123 may provide display features to indicate a current state of the application (i.e. send or receive mode). For example, while in send mode, TapAPP 123 may allow the user to access and display a media file, such as a digital photograph for transfer, on the touchscreen/display 109. In one representation of receive mode, TapAPP 123 may provide a touch point on the screen 109 or illuminate a touch point upon the user touching the touchscreen 109, thereby enabling the user to access the underlying functionality of TapAPP 123 and receive the data transfer from the sending WTRU 101. The underlying mechanics and technologies of touchscreens and displays are beyond the scope of this disclosure and are therefore omitted for the sake of clarity.

Figure 2:
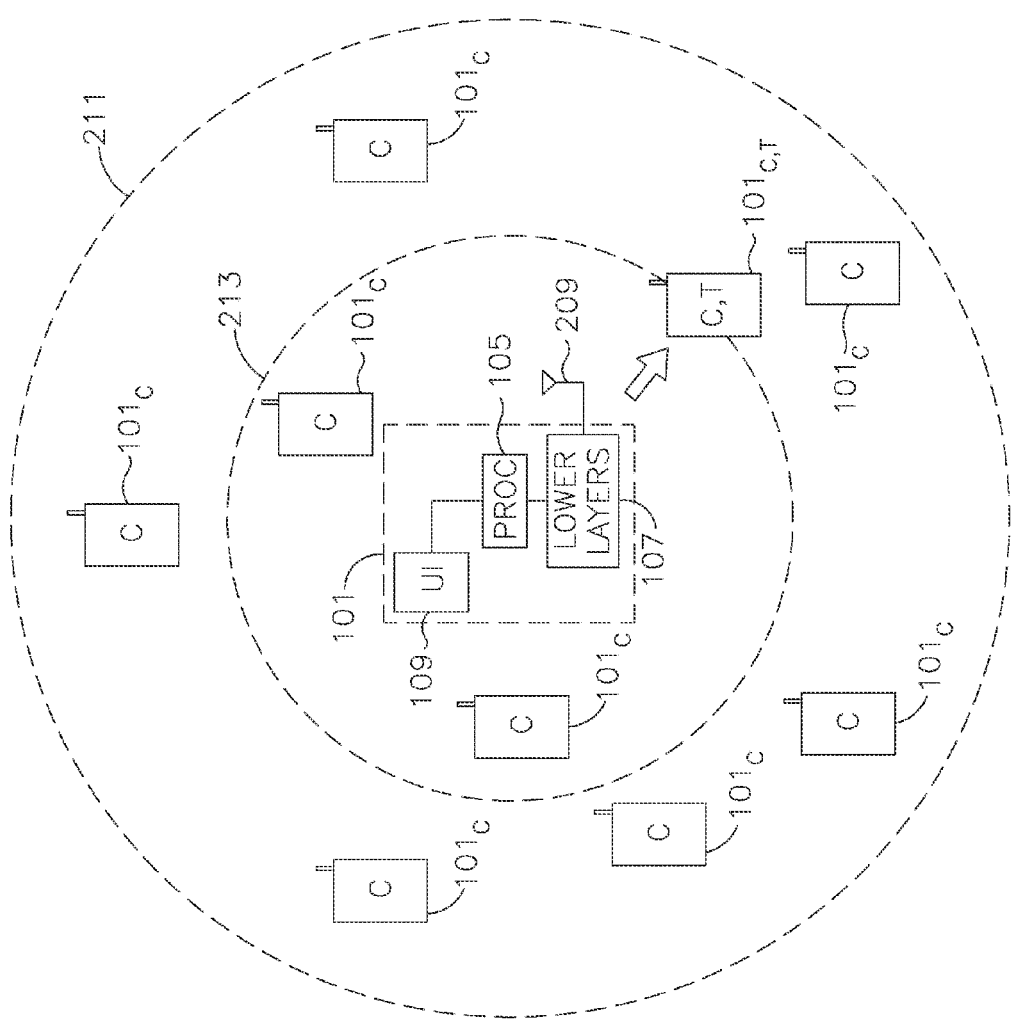
FIG. 2 shows a wireless communication environment for data communication between devices.

Referring to FIG. 2, a WTRU 101 configured for communicating data to target WTRU 101$c,t$ is shown. The WTRU 101 comprises a user interface (UI) 109, a processor 105, a communication peripheral 107, and an antenna 209. Other components located within the WTRU 101, for example, are a transmitter and receiver, but are not shown to avoid obfuscating the data communication illustration of FIG. 2. The communication peripheral 107 operates in the lower layers, for example, the physical (PHY) communication layer. The communication peripheral 107 receives and processes information relating to the electromagnetic environment in which the WTRU 101 is operating. The electromagnetic environment (hereafter referred to as local areas 211, 213) contains information being provided by the energy emanating from other WTRUs 101$c$ operating within the local areas 211, 213 of the WTRU 101.

The local area in which WTRU 101 is operating may be configured to be a smaller radius of communication as identified by 213, or the local area may be configured to be a larger radius as identified by 211. The radius that defines the local areas 211, 213 may be configured at the WTRU 101 by a user-defined variable that defines a search radius with respect to the WTRU 101. Additionally, the local area in which the WTRU 101 is operating may be defined by any other appropriate manner. The communication peripheral 107 receives and maintains the environment information relating to the WTRUs 101$c$ operating within the local areas 211, 213.

WTRUs 101$c$ operating within the local areas 211, 213 of WTRU 101 are referred to as candidate WTRUs 101$c$ because they are potential recipients of data to be communicated by WTRU 101. As shown in FIG. 2, there may be more than one candidate WTRU 101$c$ as indicated by the WTRUs denoted with a "c". Candidate WTRUs 101$c$ may be WTRUs similarly equipped like WTRU 101. From the candidate WTRUs 101$c$, at least one target WTRU 101$c,t$ will be selected. FIG. 2 shows only one target WTRU 101$c,t$, but there may be more than one target WTRU 101$c,t$ selected from the candidate WTRUs 101$c$. For example, one WTRU 101 configured to communicate data to another WTRU, may communicate data to one or a multitude of other WTRUs selected from a set of candidate WTRUs 101$c$.

WTRU 101 comprises a UI 109 which may allow a user to provide user input to the WTRU 101. Through the UI 109, the user may provide user preferences relating to the communication of data from the WTRU 101. The UI 109, may be implemented, for example, in a touchscreen/display. Using a touchscreen display, the user may provide gestural actions to indicate user preferences. The user's gestures may be directed to some visual depiction displayed on the touchscreen/display. The user may manipulate the visual depiction through a pre-defined gesture that is indicative of the user's preferences regarding the data communication. For example, the visual depiction may identify a selected media element stored in the WTRU 101. The user may manipulate the visual depiction of the media element to indicate the movement of the media element through the local areas 211, 213, in which the WTRU 101 is operating. Such movement, for example, may include distance denoted by the speed at which the visual depiction is moved across the UI 109, or alternatively by the pressure exerted on the surface of the UI 109 by the user. Other gestural inputs may be defined to indicate user preferences. Direction of a data communication within the local areas 211, 213 where the WTRU 101 is operating may be indicated by a movement of the visual depiction in the direction to indicate the direction of the data communication. Thus, for example, if the user wishes a data communication to occur between the user's WTRU 101 and another WTRU operating in local areas 211, 213 (i.e. the user has identified a desired target WTRU 101$c,t$), the user may provide a gesture via the UI 109 that is representative of the distance and direction of the selected target WTRU 101$c,t$ with respect to the sending WTRU 101.

WTRU 101 includes a processor 105 that is configurable to process information from the UI 109 and the communication peripheral 107. Electromechanical signals from the UI 109 are provided as inputs to the processor 105. Processor 105 may be configurable to execute machine readable instructions stored in any type of memory. Processor 105 is also configured to receive environment information stored by the communication peripheral 107. The environment information and the user input are then used as inputs to the processor 105 and are processed to identify a target WTRU 101$c,t$. The electromechanical inputs from the UI 109, which may include for example, an indication of direction and distance, are then correlated to the environment information stored at the lower layers by the communication peripheral 107. Based on the correlation, a identification of at least one target WTRU 101$c,t$ is determined and a data communication from the WTRU 101 may be transmitted to the identified target WTRU 101$c,t$.

The lower level information is provided to the application processor 105 according to the communication technology being used. For example, the information available to the application processor 205 may vary based on an implementation using a Third Generation Partnership Project (3GPP) technology, an Institute of Electronic and Electrical Engineers (IEEE) standard such as WiFi, or some other communication technology. For example IEEE 802.21 standard may be used where the TapAPP may register with an 802.21 client or other proprietary client to access and process lower layer information. Specific information relevant to the TapAPP's identification of a target WTRU 101$c,t$ may be provided from the communications peripheral 107.

Figure 3:
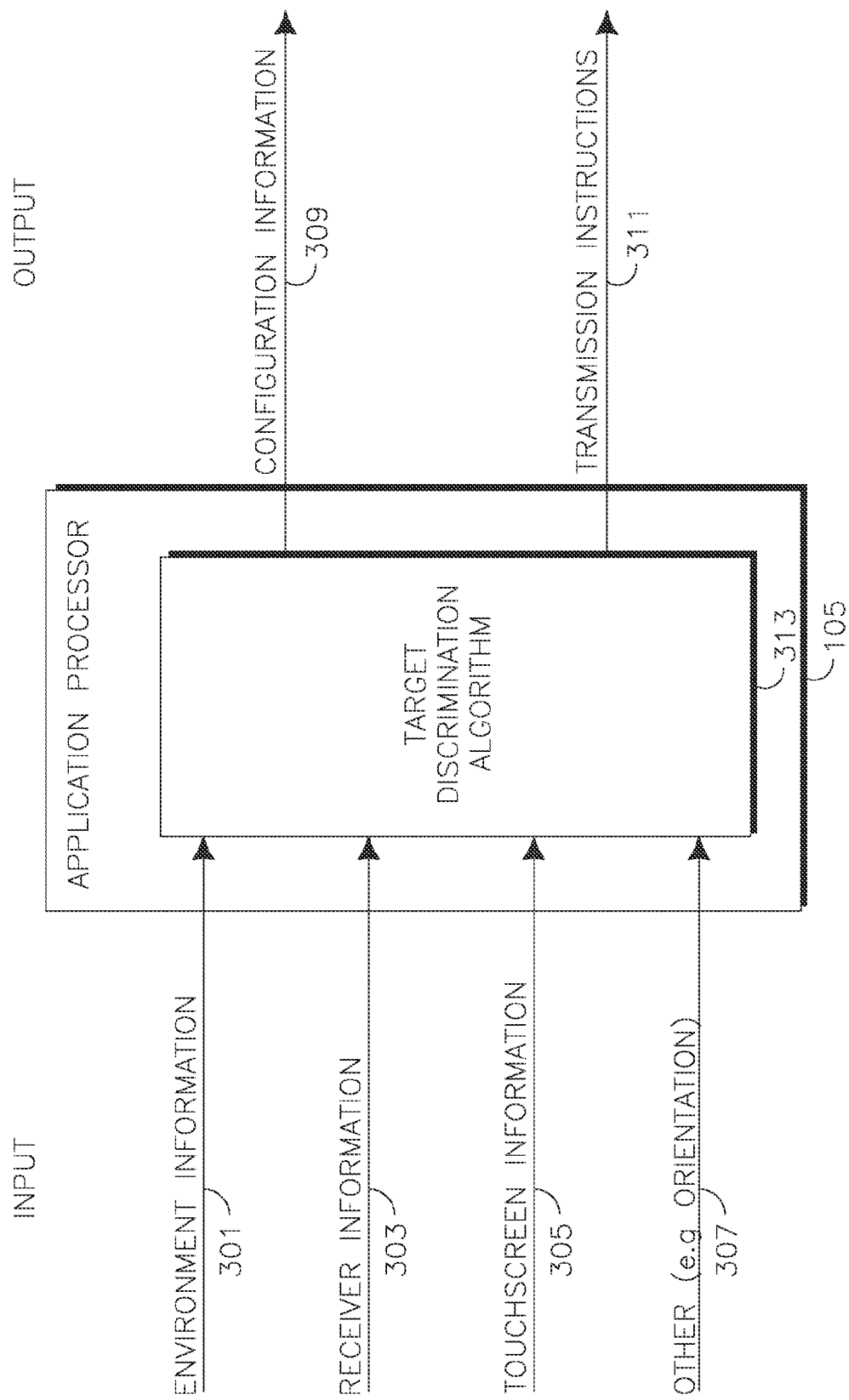
FIG. 3 shows a target discrimination algorithm for identifying a target WTRU.

FIG. 3 shows inputs that may be used to drive a target discrimination algorithm 313 that uniquely identifies a target WTRU for transfer of data. Possible inputs include environment information 301, receiver information 303, touchscreen information 305 and other information 307, such as WTRU 101 orientation for example where the WTRU 101 includes an accelerometer and supporting drivers. After processing the available inputs 301, 303, 305, and 307 by the application processor 105 through a target discrimination algorithm 313, configuration information 309 and transmission instructions 311 are generated as outputs.

The environment information 301 may, for example, be generated as follows. The application processor 105 may process instructions to periodically solicit information from the communication peripheral 107 relating to candidate WTRUs 101c operating in the local areas 211, 213 of a communicating WTRU 101. A configuration variable may be provided that allows the end user to define a search radius (e.g. 2-3 m) in which to solicit information. Devices outside the configured search radius will be excluded from received environment information. Throughout the timeframe that the application processor 105 is running a data communication application, the solicited information will be regenerated or updated. Upon receiving a user input indicating a data communication is desired, the solicited environment information 301 may be refreshed. The information collected regarding the candidate WTRUs 101c is included in the environment information 301 and may be used as an input to the target discrimination algorithm 313. In an embodiment, environment information 301 may be solicited by a localization method. For example, in a mesh network or a sensor network, the solicitation may include both the neighboring devices as well as independent device elements that enable the location and identity of each candidate WTRU to be determined accurately. Such a network may be comprised of independent sensors that respond to the communication peripheral 107 of the communicating WTRU 101, or may include the candidate WTRUs 101c, operating in the local areas 211, 213 of the communicating WTRU 101.

The environment information 301 may be gathered via a service discovery protocol (SDP) such as currently available in protocols such as Bluetooth®, for example. This protocol allows the WTRU 101 to discover the services (e.g. TapAPP as described herein) that are supported by other WTRUs operating in the local environment. An application such as TapAPP described above may invoke SDP functionality to discover all of the TapAPP enabled WTRUs operating in a particular location. For example, a Bluetooth® connection may be used to implement a SDP for this purpose. A radio dialog between the WTRU 101 and one or more candidate WTRUs 101c is established according to the defined SDP. Information received in the radio dialog may be analyzed and filtered (e.g. power level, or quality of a received signal) to determine the individual candidate WTRUs 101c or set of candidate WTRUs 101c in a local proximity. When a set of candidate WTRUs 101c is determined, a second level of search radius granularity may be applied by further defined radio dialogs between the WTRU 101 and a subset of candidate WTRUs 101c. In addition to the SDP information directly discoverable by the WTRU 101, each candidate WTRU 101c may exchange additional locally gathered information (e.g. GPS, or other location information gathered via a localization scheme) with other candidate WTRUs 101c. On a condition that a sufficient number of candidate WTRUs 101c are identified by the SDP, triangulation mechanisms may be implemented to establish a view of relative locations between a set of identified candidate WTRUs 101c. The entire environment discovery procedure may be implemented continuously and in real-time while the TapAPP is running on all the candidate WTRUs 101c with the TapAPP capabilities to update and maintain a real-time local map that is preserved in each instance of the TapAPP.

The receiver information 303, may be generated according to the following example. During data communication, send and receive operations are initiated between a sending WTRU 101 and a target WTRU 101c,t. The user of the sending WTRU 101 initiates, through a user input, a send operation for a selected media element. On the receiving side, the target WTRU 101c,t user may touch and hold the touchscreen of the target WTRU 101c,t for all or part of the transfer process. The user input of the target WTRU 101c,t may result in the target WTRU 101c,t transmitting a radio signal to the sending WTRU 101, for example, an acknowledgement signal, the radio signal may be reported to the application processor 105. This receiver information 303 may serve as an input to the target discrimination algorithm 313.

A user input received from the UI 109, for example a touchscreen/display, may be translated into application signals by the touchscreen/display 109 or processor 105. This touchscreen information 305 is input to the target discrimination algorithm 313 to identify a target WTRU 101c,t. Touchscreen information 305 may include a file reference, speed, pressure, acceleration, timing information, direction, etc. File reference information may be used to identify a selected media element stored in the file system of the sending WTRU 101 that is the object of the data communication.

Directional inputs provided by the user via the touchscreen/display 109 may be synthesized to establish relative orientation to the real-time local map and select a target WTRU 101c,t from the identified group of candidate WTRUs 101c to establish a one-to-one communication between the transmitting WTRU 101 and the target WTRU 101c,t or a selected one-to-many communication to a plurality of target WTRUs 101c,t. In an example of a user input, an accelerometer associated with the WTRU 101 may provide input regarding the orientation of the WTRU 101 with respect to the real-time local map. For example, if the WTRU 101 was held upside-down, the real-time local map would be referenced and applied upside-down as dictated by the orientation of the sending WTRU 101.

Other information 307 may be used as an input to the target discrimination algorithm 313. For example, if the sending WTRU 101 device is equipped with an accelerometer and supporting drivers, the orientation of the sending WTRU 101 may be used as input information 307. Any type of other information 307 germane to the selection of a target WTRU 101c,t may be used as an input to the target discrimination algorithm 313.

Configuration information 309 may include settings for attributes such as power level, antenna orientation, security parameters and the like. Transmission instructions 311 may include information regarding the data to be communicated and the identity of the target WTRU 101c,t as well as instructions for implementing the transfer through specific components in the communication peripheral. The configuration information 309 and transmission instructions 311 may be delivered to the communication peripheral 107. The configuration information 309 and transmission instructions 311 may impact the configuration of the Layer 2/3 baseband components, (e.g., the power settings), and/or the analog and radio frequency components, (e.g., antenna orientation of the communication peripheral 107). The application processor 105 in the sending WTRU 101 may control the manner in which the data is transferred to the target WTRU 101c,t, for example, by breaking the data into blocks corresponding to the manner in which the visual depiction of the data should appear at the target WTRU 101c,t. This control may involve the appending of some segmentation/display guidance information to the file blocks that may be used at the target WTRU 101c,t receiver to help render the visual depiction in a synergistic manner which is described in more detail hereinafter with respect to FIG. 7.

Figure 4:
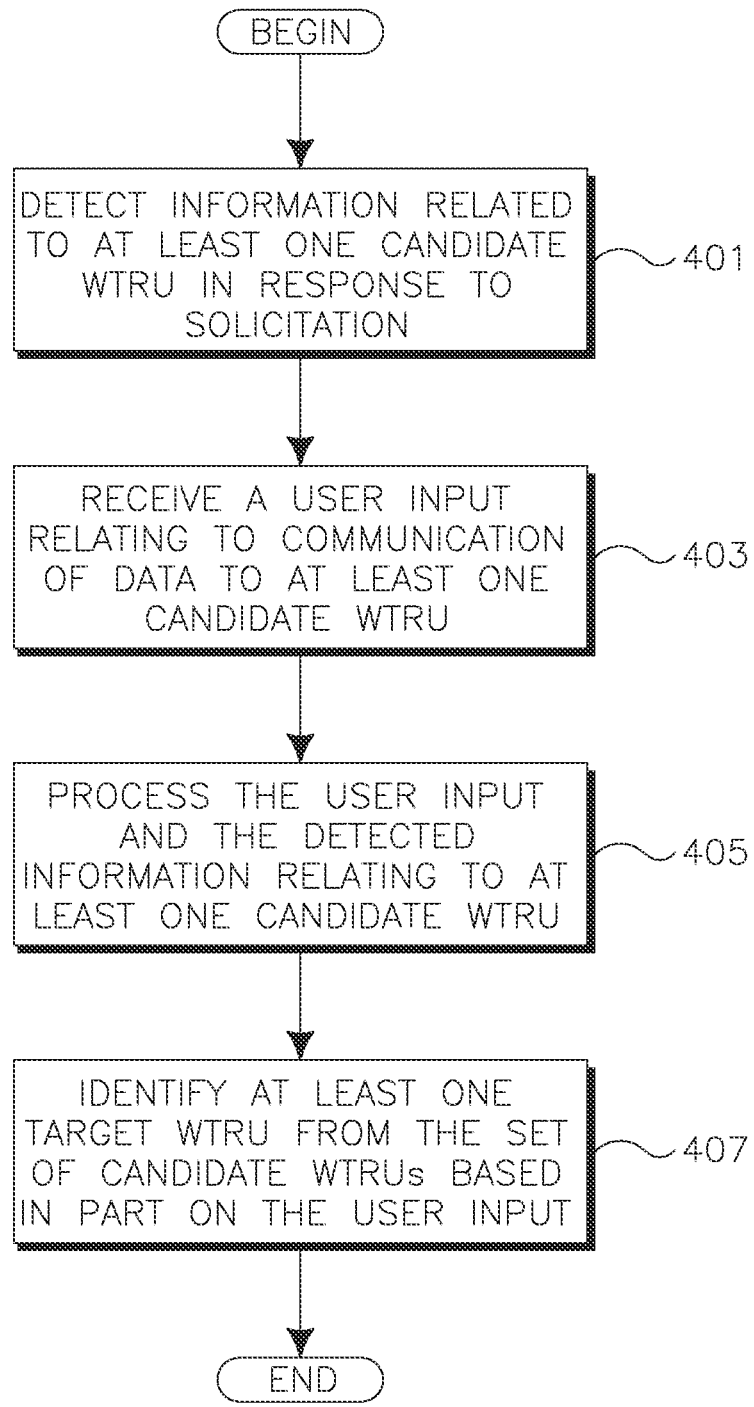
FIG. 4 is a block diagram of a method of communicating data between wireless devices.

FIG. 4 shows a method of identifying a target WTRU 101c,t for a data communication with multiple WTRUs. Environment information 301 is solicited and information related to at least one candidate WTRU 101c operating in the local area of the sending WTRU 101 is detected 401. A user input is received 403, for example, through a touchscreen/display UI 109, wherein the user input is related to the communication of data from the sending WTRU 101 to at least one candidate WTRU 101c. The user input and the environment information relating to the candidate WTRUs 101c is processed simultaneously 405. For example, in a target discrimination algorithm 313 as described in FIG. 3. At least one target WTRU 101c,t is identified from the set of candidate WTRUs 407. The target WTRU 101c,t is identified at least in part on the user input received and the environment information 301 detected.

Physical layer security mechanisms may be applied to establish the environment information 301 as well as securing the data for short range data communication between WTRUs 101. The data may be transferred only as far as is necessary to reach a minimal set of users in the local environment of the sending WTRU 101. The target discrimination algorithm 313 may be configured to secure the file from beyond a local group (i.e. the local environment of the sending WTRU 101) and excluding others. One example of achieving this is a secure data transfer based on the reciprocity of the wireless channels between the sending WTRU 101 and the target WTRU 101c,t. The uniqueness and reciprocity of the wireless channel may be utilized to accomplish this in two steps. First, the location information for a particular WTRU 101 is associated with a channel impulse response (CIR) from that WTRU 101, which is unique, albeit variable. The CIR may be used to generate a secret key stream for that location. A more detailed description of such a secret key encryption may be found in U.S. patent application Ser. No. 11/339,958 which is herein incorporated by reference. A common cipher source, for example, Advanced Encryption Standard (AES), may be seeded with the key, and the information for the target WTRU 101c,t is encrypted with it. Alternatively or in addition, the CIR based information may be used to authenticate the message. The result is that only the selected target WTRU 101c,t may receive the data, because only the target WTRU 101c,t has the required channel-based key.

Figure 5:
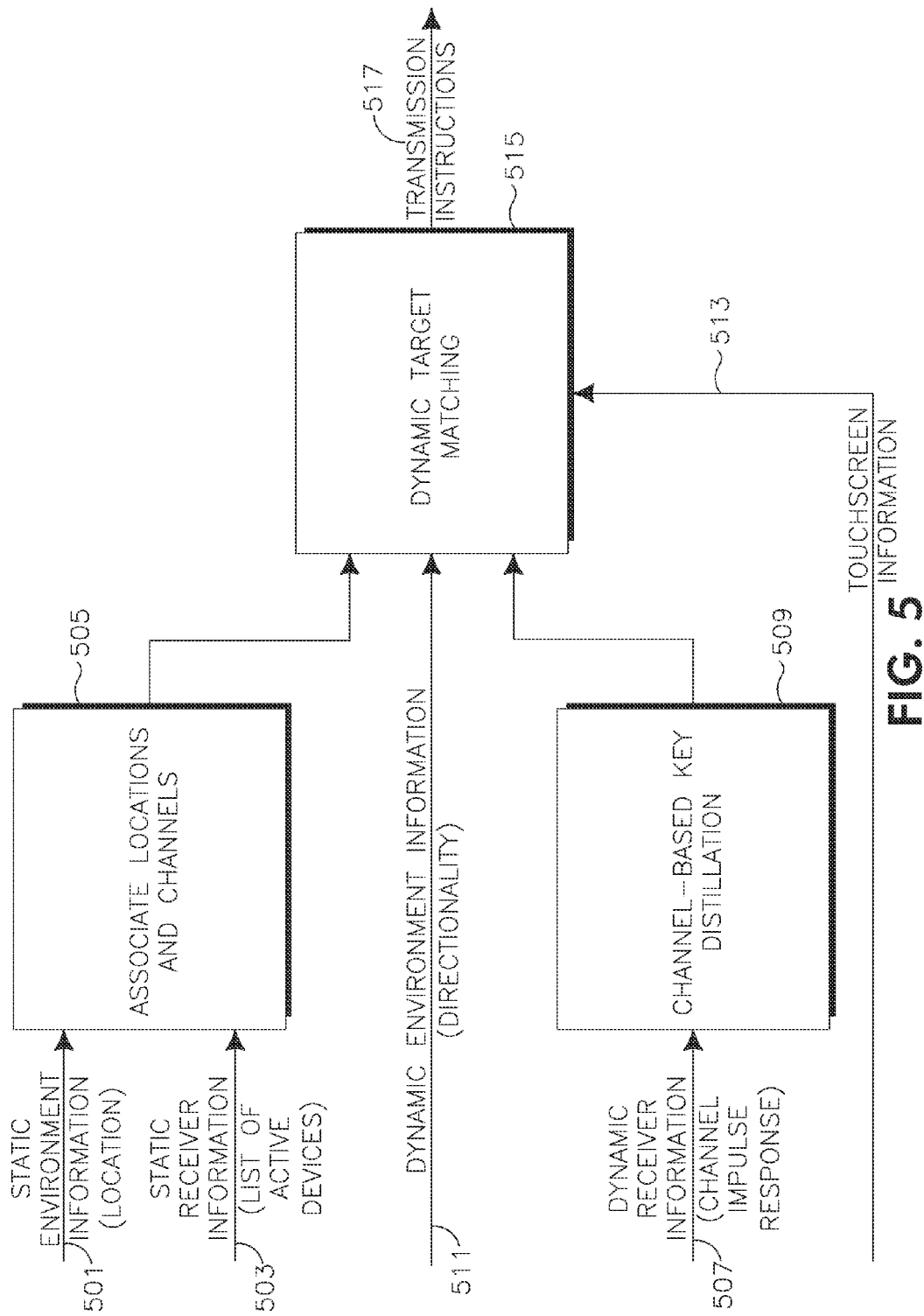
FIG. 5 is a block diagram of physical layer security for data communication between devices.

FIG. 5 shows an implementation of physical layer security for data communication between multiple WTRUs 101. The static (or slowly changing) physical location 501 of WTRUs 101 operating in the local areas 211, 213 and their respective radio channels 503 are input to a locations and channels association unit 505 that associates the locations 501 and the channels 503 of each WTRU 101 operating in the local areas 211, 213. Dynamic receiver information 507 relating to the CIR of each communicating WTRU 101 is used by channel-based key distillation unit 509, which continuously generates channel-based encryption keys for each WTRU 101 in the local environment. When required by a user, as indicated by touchscreen information 513, a target WTRU 101c,t may be identified from an available listing of candidate WTRUs 101c by the dynamic target matching algorithm 515. The dynamic target matching algorithm 515, receives input from the locations and channels association unit 505, the channel-based encryption keys 509, and the touchscreen information 513, and the directional information 511 of the sending WTRU as inputs to identify one or more target WTRUs 101c,t as the recipient(s) of the data communication. Transmission instructions 517 are generated to facilitate the data transfer to the target WTRUs 101c,t.

Figure 6:
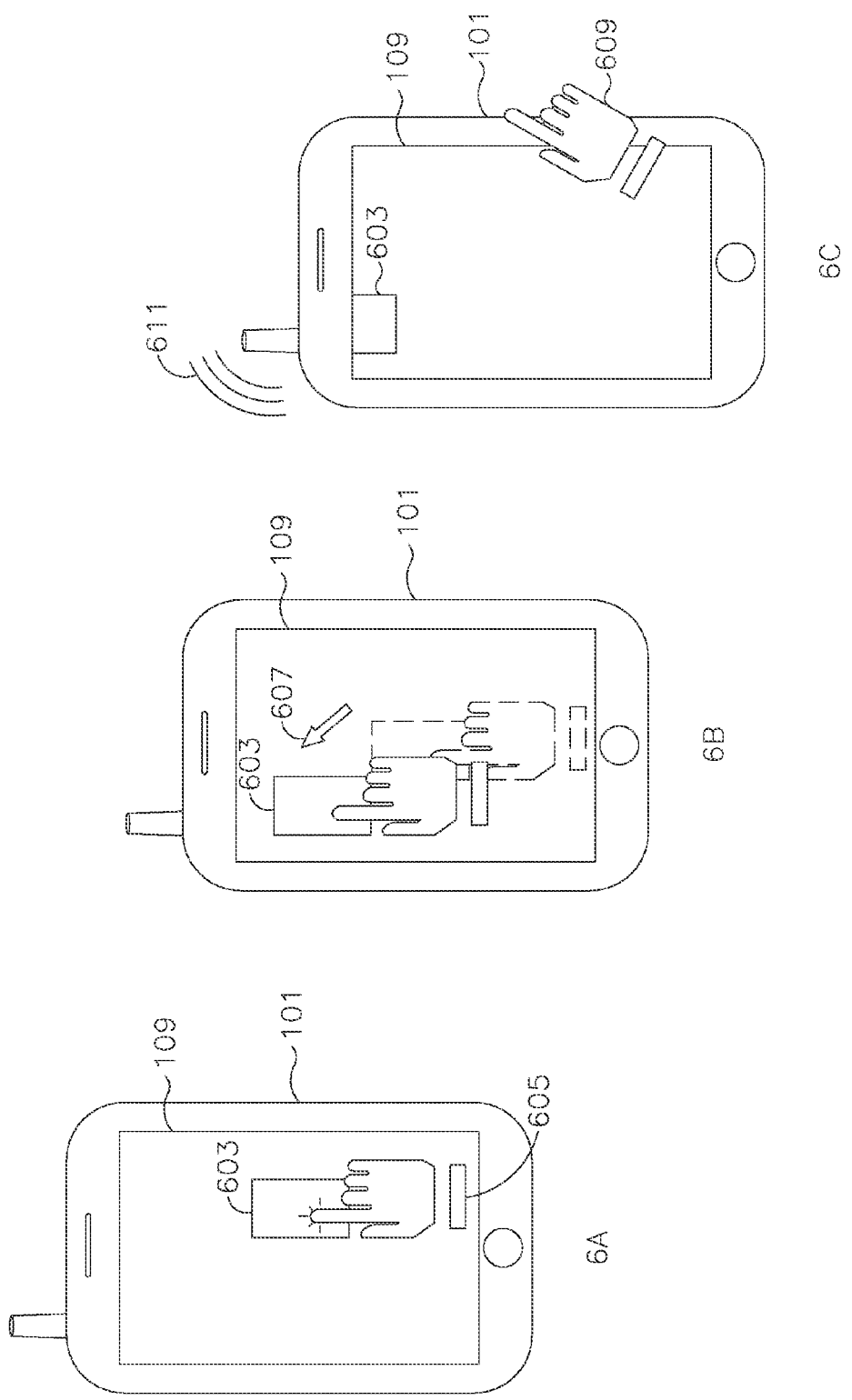
FIG. 6 shows a user input for transferring a data file between devices.

Referring now to FIG. 6, a user input action for sending a file to another device is shown. The data transfer may take place from a sending WTRU 101 as shown in FIG. 1. The sending WTRU 101 may use an application such as TapAPP 123 to facilitate the data transfer. The sending WTRU 101 may have a touchscreen/display device 109 through which an end user may provide input information to the sending WTRU 101. The transfer application (TapAPP 123) may be running on the sending WTRU 101. As an example, TapAPP 123 may be configured to receive a simple three step hand (or finger) motion to enable the data transfer. The three steps include a tap 6A, a push action 6B, and a release action 6C. Referring to 6A, the user taps 605 the touchscreen 109 at a location on the touchscreen 109 where a visual depiction 603 of a media element to be transferred is displayed. Without lifting the finger used to tap 605 the visual depiction 603, the user then pushes the visual depiction 603 of the media element across the touchscreen 109 as shown by the directional arrow 607 in FIG. 6B. In an embodiment, the direction in which the user pushes the visual depiction 603 may simulate the direction of a target receiving WTRU 101c,t which is the intended recipient of the media element to be transferred. The media element may be any type of data file capable of being stored on the WTRU 101, for example, the media element may be a digital photograph, a video file, a word processing document or the like. When the user has pushed the visual depiction 603 of the media element in the direction the user would like the media element to be transferred, the user then releases 609 contact with the visual depiction 603 to initiate the data transfer. The three user actions 6A, 6B, and 6C, provide inputs to the touchscreen 109, which may be converted to electromechanical signals through mechanisms known in the art. The electromechanical signals may serve as input to the TapAPP 123 application, which may generate environmental information and transmission instructions relating to a target WTRU 101c,t selected by TapAPP in a manner explained above with respect to FIG. 3. The environmental information 301 and transmission instructions 311 are then processed by the WTRU 101 and the media element is transmitted 611.

Figure 7A:
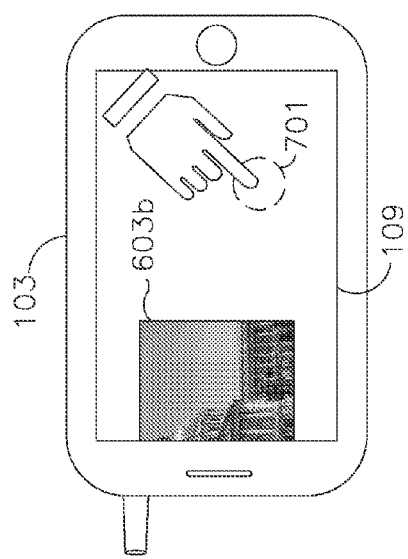
FIGS. 7A and 7B show a user experience during a data communication between devices at a sending device and a receiving device.
Figure 7A:
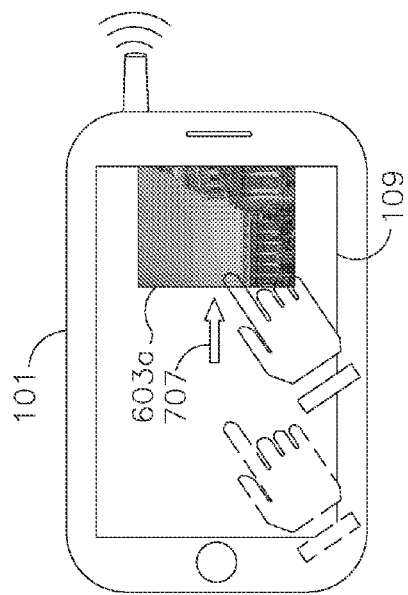
Figure 7B:
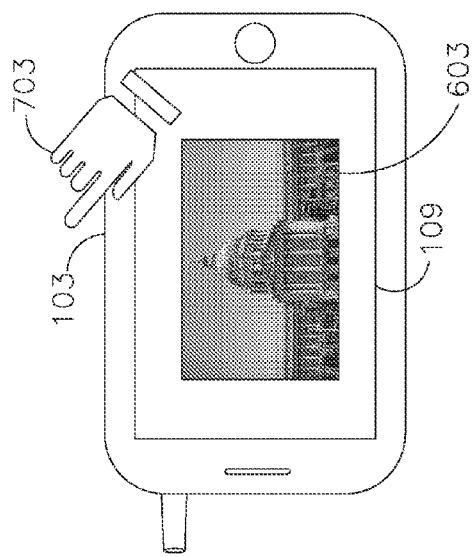

FIGS. 7A and 7B are an illustration of a data transfer depicted from the perspective of both a sending WTRU 101 and a receiving WTRU 103. The data transfer is a process between two or more WTRUs. For example, the data transfer may originate from one sending WTRU 101 and be directed toward one or more receiving WTRUs 103. As seen in FIG. 7A, the media element being transferred in this example is a digital photograph. A visual depiction 603 may be displayed on the touchscreen/display 109. The sender may touch the touchscreen 109 and push 707 the visual depiction 603 of the digital photograph in the direction of the intended receiving WTRU 103. A receiving WTRU 103 may run TapAPP 123 to enable the receiving WTRU 103 to receive the transferred data. The receiving WTRU 103, for example, may be running TapAPP 123 in a receive mode. The TapAPP 123 provides an indication 603b or a prompt that a data transfer is ready for receiving. To receive a file, the user may touch 701 the touchscreen 109 to initiate reception of the data transfer. The user may touch 701 the touchscreen 109 for the entire time the data transfer is taking place, or the user may touch 701 the touchscreen 109 for some portion of the time the data transfer is occurring.

During the transfer, the visual depiction 603 may be configured to display the progress of the data transfer to the user at one or both of the sending WTRU 101 and the receiving WTRU 103. As shown in FIG. 7A on the sending WTRU 101 as visual depiction 603a, the portion of the data transfer remaining to be sent may be displayed on the touchscreen/display 109 of the sending WTRU 101 as a partial visual depiction 603a of the digital photograph. As the data transfer progresses, the visual depiction 603a is updated to indicate the remaining amount of data to be transferred. Similarly, at the receiving WTRU 103, a visual depiction 603b may be displayed on the touchscreen/display 109 of the receiving WTRU 103 to indicate to a user the amount of the data transfer that has been transmitted to the receiving WTRU 103. As shown in FIG. 7B, when the data transfer is complete, the visual depiction 603 is displayed in its entirety at the receiving WTRU 103. Upon receipt of the file, the user of the receiving WTRU 103 may release the touchscreen 109 and the receiving WTRU 103 may send an application level acknowledgment to the sending WTRU 101. Thus, as shown in FIGS. 7A and 7B, the user may observe the visual depiction 603a disappearing from the sending WTRU 101 while the visual depiction 603b is emerging on the receiving WTRU 103 in such manner that the overall visual depiction 603 is preserved for the duration of the data transfer. The underlying data transfer mechanism may prioritize the transfer of data file elements to enable this user experience. In an alternate embodiment, this user experience may be provided at the application level. The file may be transferred as a whole, but the rendering aspect of the application on both the send and receive sides of the data transfer creates the appearance of a progressive and contiguous data transfer.

Figure 8:
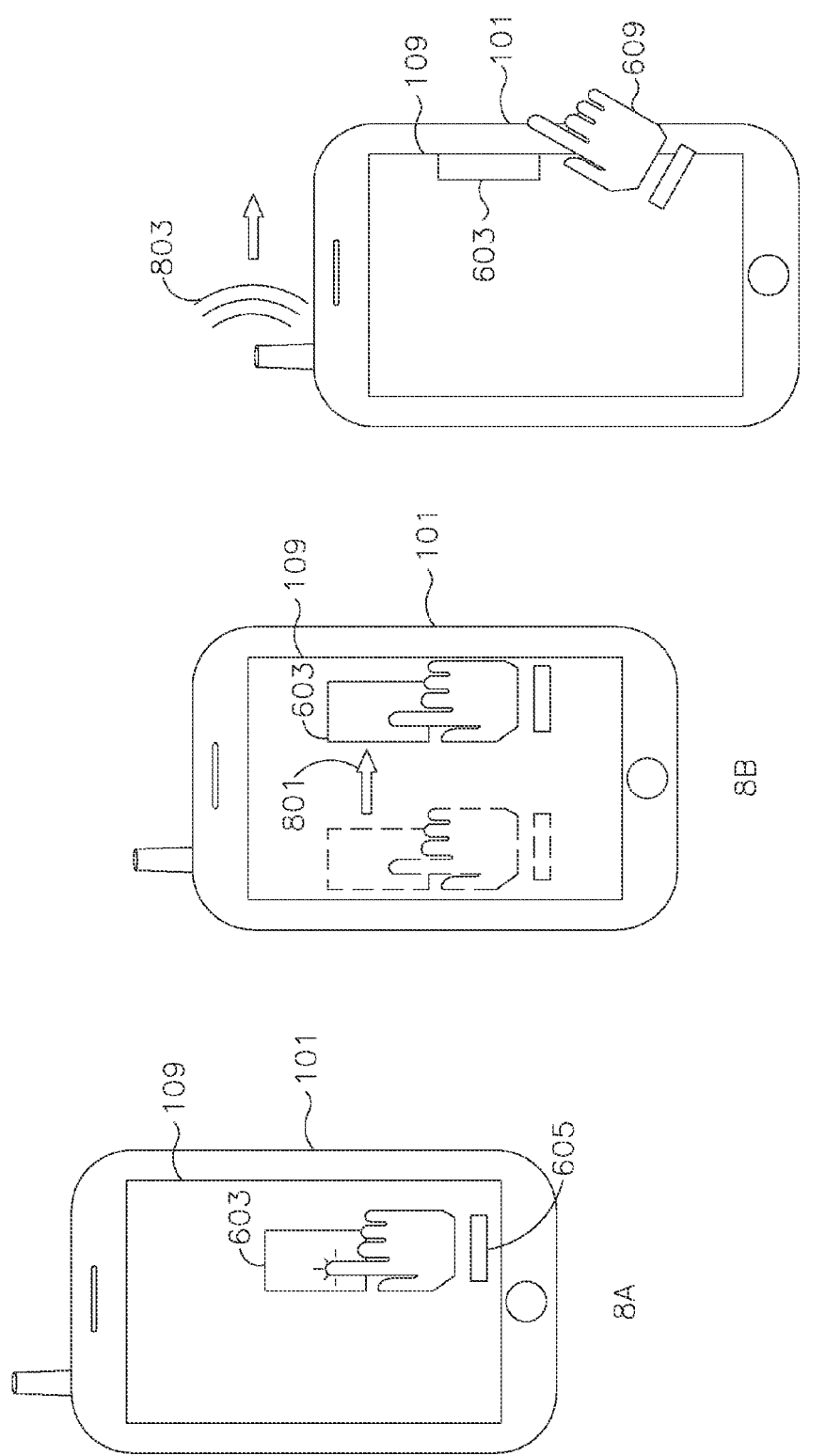
FIG. 8 shows a user input for transferring a data file to a target device, where the user input includes a directional indication of the location of the target device.

FIG. 8 is an illustration of the user experience while sending a data transfer in a direction of a targeted recipient. The same three step process described in FIG. 6 is utilized where the sender taps 605 a visual depiction 603 of the selected media element. As shown in FIG. 8B, the sender then pushes the visual depiction 603 of the media element to the right 801 which may simulate the physical direction with relation to the sending WTRU 101 where an intended receiving WTRU 103 (not shown) is operating. Based on the input information of the user, including the direction 801 in which the sender pushed the visual depiction 603 of the media element, the sending WTRU 101 may be configured to transmit the data transfer in a direction 803 matching the direction of the user action direction 801. The visual depiction 603 may be configured to indicate the progress of the data transfer and may accomplish this by causing the visual depiction 603 to disappear from the touchscreen/display 109 in the same direction as the user action direction 801. Antenna orientation may be utilized to control the transmission direction 803.

Figure 9:
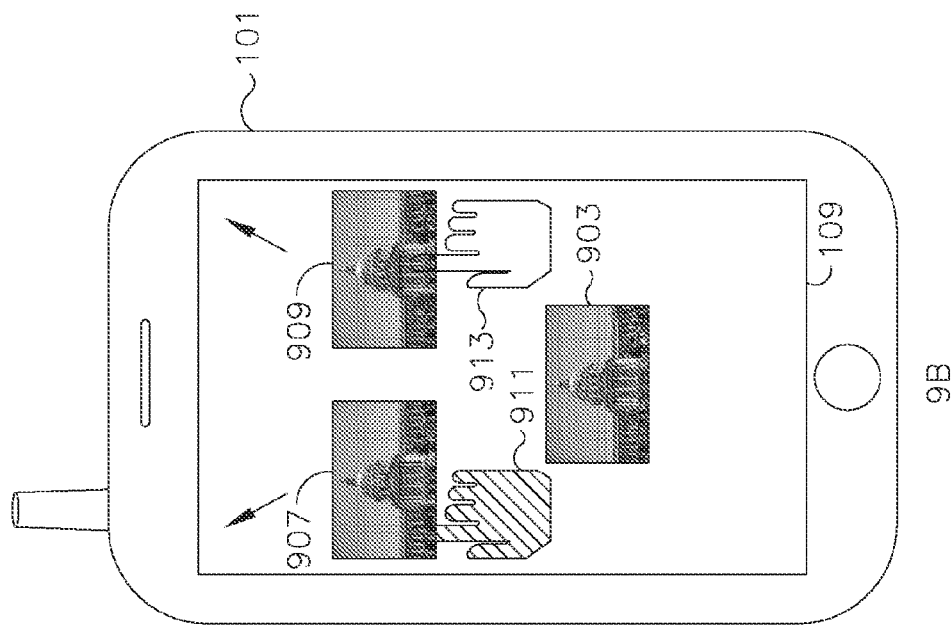
FIG. 9 shows a user input for transferring a data file from a sending device to multiple receiving devices.
Figure 9:
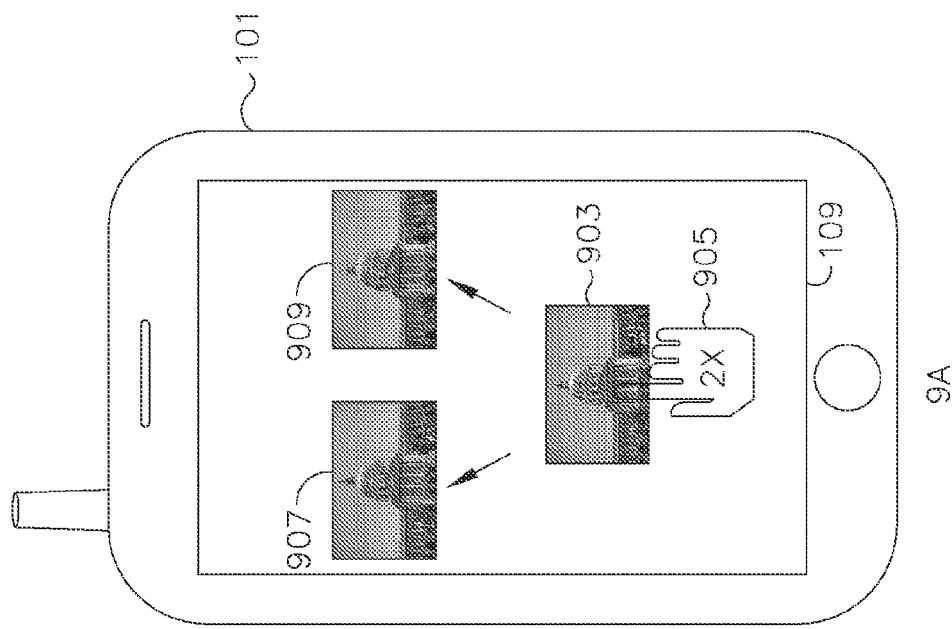

FIG. 9 shows an illustration of a UI 109 being used to perform a data communication to multiple receiving WTRUs. The user may tap on a visual depiction 903 of a media element selected for communication to a receiving WTRU as shown in FIG. 9A. As shown, the user may tap on the visual depiction 903 multiple times 905. While in the example of FIG. 9A, the user taps the visual depiction 903 twice, the user may tap the visual depiction 903 any number of times corresponding to the intended number of receiving WTRUs. Upon performing a multiple tap 905, the master visual depiction 903 will be split into a number of secondary visual depictions 907, 909 equal to the number of taps 905 of the user. This action by the user will lock the master visual depiction 903 while allowing the secondary visual depictions 907, 909 to be manipulated by the user via the UI 109. For example, with respect to FIG. 9B, a user may use a two-hand, two finger motion to move secondary visual depiction 907 in the direction of a first target WTRU, while simultaneously moving secondary visual depiction 909 in the direction of a second target WTRU. The user may also use a single-hand, single finger motion to move each secondary visual depiction 907, 909 sequentially. Upon release of the secondary visual depiction 907, 909, the data is communicated to a target WTRU identified by the process described herein regarding FIG. 2. The secondary visual depictions 907, 909 may be smaller than the master visual depiction 903, or the secondary depictions may be the same size as the master depiction. Alternatively, the secondary depictions 907, 909 may have a visually distinguishing feature that distinguishes them from the master depiction 903 to the user.

Although features and elements are described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) or Ultra Wide Band (UWB) module.

What is claimed is:

1. A method performed by a wireless transmit/receive unit (WTRU), the method comprising:
    processing, by the WTRU from a touch display, an input to select media in an application;
    detecting, by the WTRU over bluetooth, another WTRU;
    processing, by the WTRU, another input from the touch display to select the another WTRU;
    sending, by the WTRU to the selected another WTRU, a message to transfer the selected media;
    receiving, by the WTRU, an acceptance to transfer the selected media; and
    transferring, by the WTRU to the selected another WTRU over WiFi, the selected media.

2. The method of claim 1, wherein the input or the another input is a multi-touch input.

3. The method of claim 1 further comprising:
displaying, by the WTRU, a progress of the transfer to the selected another WTRU.

4. The method of claim 1, wherein the media is any one of a photograph, video, or a document.

5. The method of claim 1, wherein the input or the another input is a tap.

6. The method of claim 1, wherein the message to transfer is a request.

7. The method of claim 1, wherein the transferring by the WTRU over WiFi uses a WiFi link.

8. The method of claim 1, wherein the transferring by the WTRU is provided by a communication peripheral.

9. The method of claim 1 further comprising using bluetooth to detect one of a plurality of WTRUs in proximity to the WTRU.

10. The method of claim 9, wherein the detection of the plurality of WTRUs utilizes a service discovery protocol.

11. The method of claim 1 further comprising:
processing, by the WTRU, release of a touch contact to initiate transfer of the selected media to the selected another WTRU.

12. The method of claim 1 further comprising:
determining, by the WTRU, that the selected another WTRU is compatible to receive the selected media.

13. The method of claim 1, wherein a real time map is maintained of a plurality of WTRUs in proximity to the WTRU.

14. The method of claim 1 further comprising:
determining, by the WTRU, environment information that lists a plurality of WTRUs in proximity to the WTRU.

15. The method of claim 1, wherein the WTRU processes the input or the another input based on information from the touch display.

16. The method of claim 1 further comprising:
initiating, by the WTRU, transfer of media based on a gesture on a visual representation, displayed on the touch display, of the media; and
wherein the gesture is in a direction of an intended receiving WTRU.

17. The method of claim 1, wherein the input or the another input is a gesture input.

18. The method of claim 1, wherein the input or the another input is a multi-finger input.

19. The method of claim 1, wherein the input or the another input is a multi-finger gesture.

20. The method of claim 1 further comprising:
transferring, by the WTRU to the selected another WTRU, additional display information; and
wherein the additional display information is displayed before the selected media is completely transferred.

21. The method of claim 1 further comprising:
receiving, by the WTRU from a different WTRU, a request to transfer other media;
receiving, in response to accepting the request by the WTRU, the other media; and
displaying, by the WTRU, the other media substantially completely to a user of the WTRU.

22. The method of claim 1, wherein the input or the another input is a gesture input.

23. A wireless transmit/receive unit (WTRU) comprising:
circuitry configured to process, from a touch display, an input to select media in an application;
circuitry configured to detect, by the WTRU over bluetooth, another WTRU;
the circuitry further configured to process another input from the touch display to select the another WTRU;
circuitry configured to send, by the WTRU to the selected another WTRU, a message to transfer the selected media;
circuitry configured to receive, by the WTRU, an acceptance to transfer the selected media; and
circuitry configured to transfer, by the WTRU to the selected another WTRU over WiFi, the selected media.

24. The WTRU of claim 23, wherein the input or the another input is a multi-touch input.

25. The WTRU of claim 23 further comprising:
circuitry configured to display, by the WTRU, a progress of the transfer to the selected another WTRU.

26. The WTRU of claim 23, wherein the media is any one of a photograph, video, or a document.

27. The WTRU of claim 23, wherein the first input or the another input is a tap.

28. The WTRU of claim 23, wherein the message to transfer is a request.

29. The WTRU of claim 23, wherein the circuitry configured to transfer over WiFi uses a WiFi link.

30. The WTRU of claim 23, wherein the circuitry configured to transfer is provided by a communication peripheral.

31. The WTRU of claim 23 further comprising using bluetooth to detect one of a plurality of WTRUs in proximity to the WTRU.

32. The WTRU of claim 31, wherein the detection of the plurality of WTRUs utilizes a service discovery protocol.

33. The WTRU of claim 23 further comprising:
the circuitry further configured to process, by the WTRU, release of a touch contact to initiate transfer of the selected media to the selected another WTRU.

34. The WTRU of claim 23 further comprising:
circuitry configured to determine, by the WTRU, that the selected another WTRU is compatible to receive the selected media.

35. The WTRU of claim 23, wherein a real time map is maintained of a plurality of WTRUs in proximity to the WTRU.

36. The WTRU of claim 23 further comprising:
circuitry configured to determine, by the WTRU, environment information that lists a plurality of WTRUs in proximity to the WTRU.

37. The WTRU of claim 23, wherein the WTRU processes the input or the another input based on information from the touch display.

38. The WTRU of claim 23 further comprising:
circuitry configured to initiate, by the WTRU, transfer of media based on a gesture on a visual representation, displayed on the touch display, of the media; and
wherein the gesture is in a direction of an intended receiving WTRU.

39. The WTRU of claim 23, wherein the input or the another input is a gesture input.

40. The WTRU of claim 23, wherein the input or the another input is a multi-finger input.

41. The WTRU of claim 23, wherein the input or the another input is a multi-finger gesture.

42. The WTRU of claim 23 further comprising:
the circuitry further configured to transfer, by the WTRU to the selected another WTRU, additional display information; and
wherein the additional display information is displayed before the selected media is completely transferred.

43. The WTRU of claim 23 further comprising:
the circuitry further configured to receive, by the WTRU from a different WTRU, a request to transfer other media;

the circuitry further configured to receive, in response to accepting the request by the WTRU, the other media; and circuitry configured to display, by the WTRU, the other media substantially completely to a user of the WTRU.

44. The WTRU of claim 23, wherein the input or the another input is a gesture input.

45. The method of claim 7, wherein the WiFi link operates using 802.21.

46. The method of claim 7, wherein the WiFi link utilizes peer-to-peer communication.

47. The method of claim 46, wherein the peer-to-peer communication operates in WiFi ad-hoc mode.

48. The WTRU of claim 29, wherein the WiFi link operates using 802.21.

49. The WTRU of claim 29, wherein the WiFi link utilizes peer-to-peer communication.

50. The WTRU of claim 49, wherein the peer-to-peer communication operates in WiFi ad-hoc mode.

* * * * *